(12) United States Patent
Chen et al.

(10) Patent No.: US 9,703,180 B2
(45) Date of Patent: Jul. 11, 2017

(54) PROJECTION APPARATUS, LENS MODULE, AND LOCKING STRUCTURE

(71) Applicant: Coretronic Corporation, Hsin-Chu (TW)

(72) Inventors: Chi-Chen Chen, Hsin-Chu (TW); Chia-Tien Chen, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 48 days.

(21) Appl. No.: 14/666,431

(22) Filed: Mar. 24, 2015

(65) Prior Publication Data

US 2015/0370151 A1 Dec. 24, 2015

(30) Foreign Application Priority Data

Jun. 18, 2014 (CN) .......................... 2014 1 0273132

(51) Int. Cl.
| | | |
|---|---|---|
| *G03B 21/14* | (2006.01) | |
| *G02B 7/00* | (2006.01) | |
| *G03B 5/00* | (2006.01) | |
| *G02B 13/16* | (2006.01) | |

(52) U.S. Cl.
CPC .......... *G03B 21/142* (2013.01); *G02B 7/004* (2013.01); *G03B 5/00* (2013.01); *G02B 13/16* (2013.01)

(58) Field of Classification Search
CPC ...... G02B 7/004; G02B 13/16; G03B 21/142; G03B 5/00
See application file for complete search history.

(56) References Cited

U.S. PATENT DOCUMENTS

| | | | |
|---|---|---|---|
| 6,829,108 B2 | 12/2004 | Koba et al. | |
| 6,966,657 B2 | 11/2005 | Van De Velde et al. | |
| 7,064,910 B2 | 6/2006 | Lee et al. | |
| 2002/0044264 A1* | 4/2002 | Lu ........................ | G03B 21/142 353/101 |
| 2004/0070851 A1* | 4/2004 | Koba ....................... | G03B 5/00 359/813 |
| 2009/0316117 A1* | 12/2009 | Tseng ....................... | G03B 3/00 353/101 |

* cited by examiner

*Primary Examiner* — Sultan Chowdhury
*Assistant Examiner* — Magda Cruz
(74) *Attorney, Agent, or Firm* — WPAT, PC

(57) ABSTRACT

A projection apparatus includes a light source, a light valve, and a lens module. The light source provides a light beam. The light valve converts the light beam into an image beam. The lens module converts the image beam into a projecting beam and includes a lens and a locking structure. The locking structure is connected to the lens and includes a first plate, a second plate, a moving element, and a first pushing element. The second plate is disposed between the first plate and the lens and firmly fixed to the lens. A groove is formed between the first plate and the second plate, and the groove has withstanding holes arranged along a first direction. The moving element is disposed between the first plate and the second plate. The first pushing element is disposed between the moving element and the second plate.

24 Claims, 7 Drawing Sheets

PROJECTION APPARATUS, LENS MODULE, AND LOCKING STRUCTURE

FIELD OF THE INVENTION

The invention relates to a projection apparatus and a lens module. More particularly, the invention relates a projection apparatus and a lens module having a locking structure.

BACKGROUND OF THE INVENTION

At present, many types of display device are provided, in which one of the types of the display device is a projection apparatus having a smaller size to be capable of projecting a large size image being a plurality of times over a surface area of the projection apparatus, thereby resulting in the projection apparatus having an irreplaceable superiority in the display industry.

A conventional projection apparatus has a light valve to form a fixed offset relative to an optical axis for projecting an image into the screen. However, the fixed offset of the light valve cannot be changed because the projecting lens is fixed on the projection apparatus. Therefore, once an image projecting location has to be changed, a location of the projection apparatus also has to be changed. In the other words, once the location of the projection apparatus has to be changed, the image projecting location also has to be changed. From another point of view, owing that the conventional projection apparatus cannot change the fixed offset of the light valve of the projecting lens, the conventional projection apparatus may be inconvenient to be used.

Recently, there are some patents about disposing an extra structure to change the location of the projection apparatus for projecting a image onto a target position such as U.S. Pat. No. 6,966,657B2, U.S. Pat. No. 6,829,108B2, U.S. Pat. No. 7,064,910B2, and so on. However, the aforementioned patents still have some problems.

The information disclosed in this BACKGROUND section is only for enhancement of understanding of the BACKGROUND of the described technology and therefore it may contain information that does not form the prior art that is already known to a person of ordinary skill in the art. Further, the information disclosed in the BACKGROUND section does not mean that one or more problems to be resolved by one or more embodiments of the invention was acknowledged by a person of ordinary skill in the art.

SUMMARY OF THE INVENTION

The invention provides a projection apparatus, a lens module, and a locking structure to improve the adjustment of the projecting location for user.

According to an embodiment of the invention, a projection apparatus includes a light source, a light valve, and a lens module. The light source is configured to provide a light beam. The light valve is configured to convert the light beam into an image beam. The lens module is configured to convert the image beam into a projecting beam and includes a lens and a locking structure. The locking structure is connected to the lens and includes a first plate, a second plate, a moving element, and a first pushing element. The second plate is disposed between the first plate and the lens, and is firmly fixed to the lens. A groove is formed between the first plate and the second plate, and the groove has a plurality of withstanding holes arranged along a first direction. The moving element is disposed between the first plate and the second plate, and is configured for movably abutting against one of the withstanding holes. The first pushing element is disposed between the moving element and the second plate, and is configured for abutting against the moving element along a second direction unparallel to the first direction.

According to the embodiment disclosed herein, the projection apparatus further includes a shell. The light source and the light valve are disposed in the shell, and a part of the lens module is exposed to a first opening of the shell to limit the lens module to move along the first direction.

According to the embodiment disclosed herein, the projection apparatus further includes a limiting rod connected to the second plate, wherein a part of the limiting rod is exposed to a second opening of the shell, and the limiting rod contacts the shell to cause the lens module to be firmly fixed to the shell.

According to another embodiment of the invention, a lens module includes a lens and a locking structure. The locking structure is connected to the lens and includes a first plate, a second plate, a moving element, and a first pushing element. The second plate is disposed between the first plate and the lens, and is firmly fixed to the lens. A groove is formed between the first plate and the second plate, and the groove has a plurality of withstanding holes arranged along a first direction. The moving element is disposed between the first plate and the second plate, and is configured for movably abutting against one of the withstanding holes. The first pushing element is disposed between the moving element and the second plate, and is configured for abutting against the moving element along a second direction unparallel to the first direction.

According to another embodiment disclosed herein, the first pushing element drives the moving element to slip into and abut against one of the withstanding holes or the first pushing element drives the moving element to slip out of one of the withstanding holes when the second plate moves relative to the first plate along the first direction.

According to another embodiment disclosed herein, the first direction is perpendicular to the second direction, and the second direction is parallel to an extending direction of an optical axis of the lens.

According to another embodiment disclosed herein, the lens module further includes a limiting element having a limiting pillar and a limiting block connected to the limiting pillar. The limiting pillar is firmly fixed to and connected between the limiting block and the first plate. The second plate has a long hole hitching the limiting pillar for limiting between the limiting block and the first plate, and a long aperture of the long hole is parallel to the first direction to limit the second plate to move along the first direction.

According to another embodiment disclosed herein, the moving element is a sphere.

According to another embodiment disclosed herein, the first pushing element is an elastic element.

According to another embodiment disclosed herein, the lens module further includes a second pushing element connected to the first pushing element. The first pushing element and the second pushing element are configured to jointly move along the second direction to abut against the moving element.

According to another embodiment disclosed herein, the second pushing element is an elastic element.

According to another embodiment of the invention, a locking structure is configured to connect to a lens and includes a first plate, a second plate, a moving element, and a pushing element. A groove is formed between the first plate and the second plate. The groove has a plurality of withstanding holes, and the withstanding holes are arranged along a first direction. The moving element is disposed between the first plate and the second plate, and is configured for movably abutting against one of the withstanding holes. The pushing element is disposed between the moving element and the second plate, and is configured to abut against and connect to the moving element along a second direction unparallel to the first direction.

According to another embodiment disclosed herein, the pushing element drives the moving element to slip into and abut against one of the withstanding holes or the pushing element drives the moving element to slip out of one of the withstanding holes when the second plate moves relative to the first plate along the first direction.

According to the above description, an offset of the light axis of the lens of the lens module of the projection apparatus of the embodiment may be changed by the locking structure of the lens module such that the image beam emitted by the projection apparatus may be projected to a corresponding/different location(s) according to the location of the projection apparatus or the desired projecting location, thereby result in enhancing the utility and the convention for using of the projection apparatus. In the embodiment of the invention, since the locking structure is disposed on the lens module, the integral volume and the integral weight of the projection apparatus are not increased. On other hand, the locking structure has a simple configuration to be capable of decreasing the addition cost of the projection apparatus manufacturing process.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
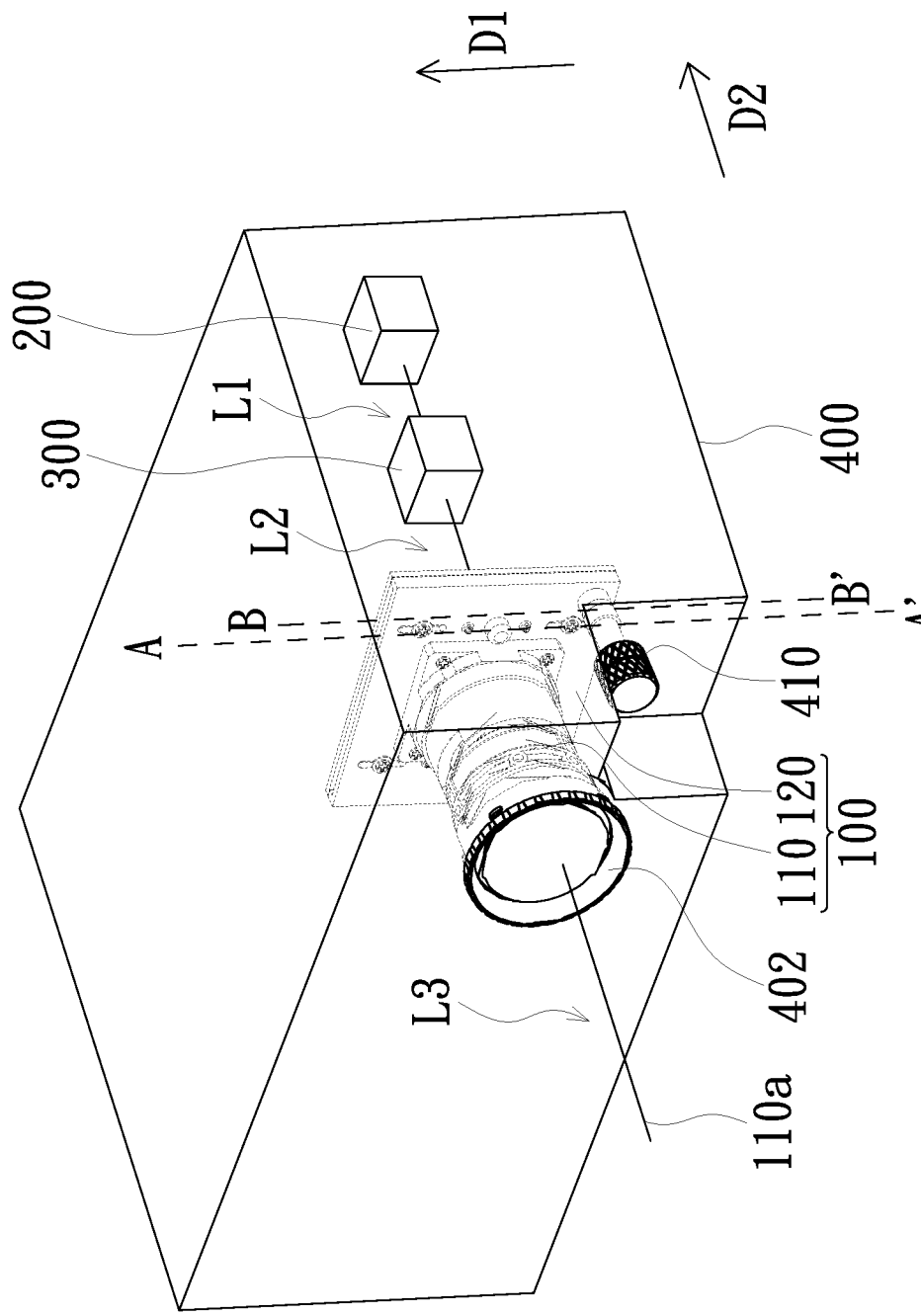
FIG. 1 illustrates a perspective view of a projection apparatus according to an embodiment of the invention.

Please refer to FIG. 1, it shows a perspective view of a projection apparatus 10 according to an embodiment of the invention. As shown in FIG. 1, the projection apparatus 10 includes a light source 200, a light valve 300, and a lens module 100. The light source 200 provides a light beam L1. The light valve 300 converts the light beam L1 into an image beam L2. Furthering, the lens module 100 may, not be limited to, convert the image beam L2 into a projecting beam L3 and project the projecting beam L3 onto a screen (not shown). In the embodiment, the lens module 100 includes a lens 110 and a locking structure 120. The locking structure 120 may drive the lens 110 to move along a first direction D1 such that the lens 110 may be located on/fixed to a particular location, therefore an offset of a light axis 110a of the lens 110 of the lens module 100 may be changed. In other words, a location of projecting the projecting beam L3 may be changed. Therefore, the lens 110 of the lens module 100 may be driven by the locking structure 120 to change the offset of the light axis 110a of the lens 110 such that the projecting beam L3 of the lens 110 may be projected onto a suitable position to display a complete image when an image projecting location would like to be changed. However, the locations of the light source 200 and the light valve 300 are just exemplified and do not limit the invention.

In the embodiment, the projection apparatus 10 further includes a shell 400. The light source 200 and the light valve 300 are disposed in the shell, and a part of the lens module 100 is exposed to a first opening 402 of the shell 400 such that the lens module 100 is limited to be able to move along the first direction D1.

Figure 2A:
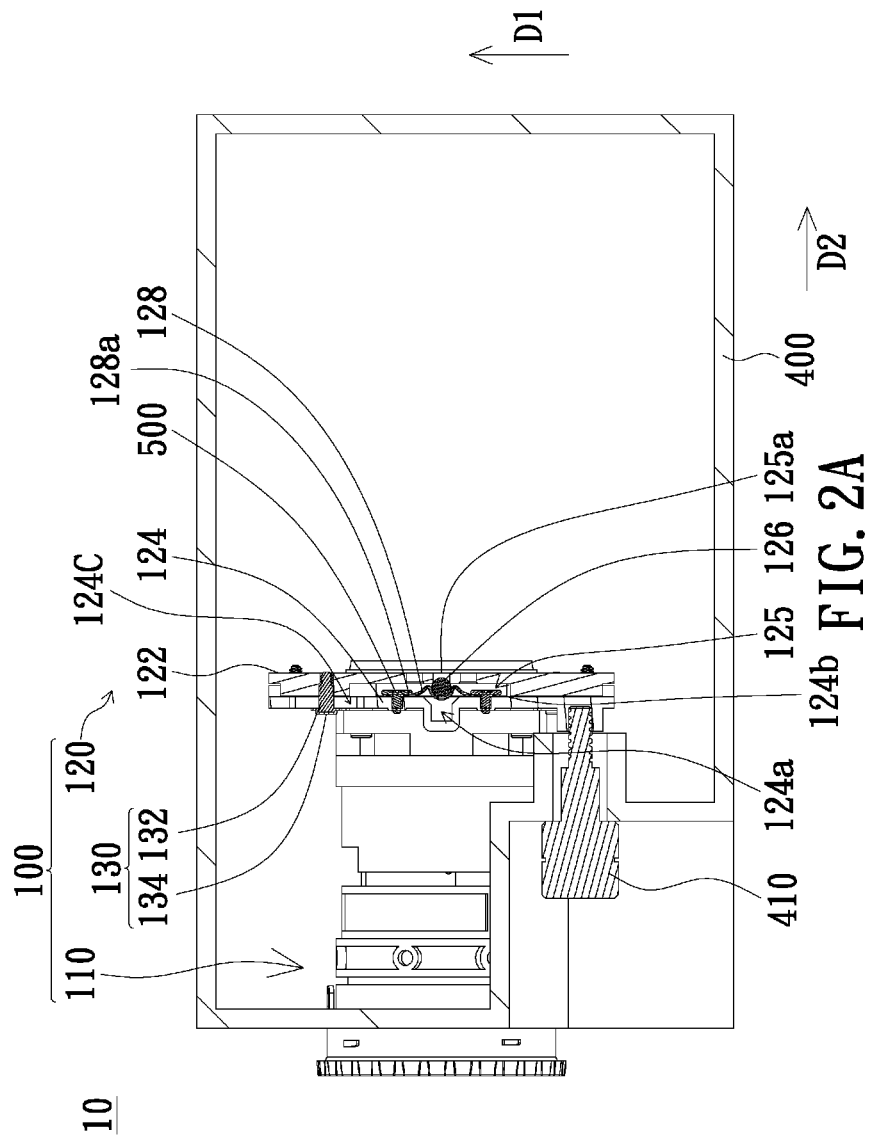
FIG. 2A illustrates a cross-sectional view along a section line A-A' of the projection apparatus of FIG. 1.

Please refer to FIG. 2A, it shows a cross-sectional view along a section line A-A' of the projection apparatus 10 of FIG. 1. As shown in FIG. 2A, the lens module 100 includes the lens 110 and the locking structure 120. The locking structure 120 is connected to the lens 110, and the locking structure 120 includes a first plate 122, a second plate 124, a moving element 126, and a first pushing element 128.

The second plate 124 is firmly fixed to the lens 110 and disposed between the first plate 122 and the lens 110. A groove 125 is formed between the first plate 122 and the second plate 124, and the groove 125 has a plurality of withstanding holes 125a (for example, three withstanding holes 125a may be respectively disposed in an upper position, a middle position, and an upper position) arranged/disposed along a first direction D1. In the embodiment, the groove 125 may be formed in the first plate 122 and the groove 125 may be a rectangular groove. A long side of the groove 125 is, but not limited to, parallel to the first direction D1. In some embodiment, the withstanding holes 125a may be arranged in intervals along the first direction D1. Furthermore, the intervals may be, but not limited to, equal to each other.

The moving element 126 is disposed between the first plate 122 and the second plate 124, and is configured for movably pushing/abutting against one of the withstanding holes 125a. Furthering, the moving element 126 may be disposed in the groove 125 located between the first plate 122 and the second plate 124. Simultaneously, the moving element 126 may be, but not limited to, driven to move in the groove 125 along the first direction D1 by an outer power/force. In the embodiment, the moving element 126 may be, but not limited to, a sphere/ball.

The first pushing element 128 is disposed between the moving element 126 and the second plate 124 and the first pushing element 128 is configured to abut against the moving element 126 along a second direction D2 unparallel to the first direction D1. In addition, the second plate 124 has a containing space 124a. The first pushing element 128 is disposed in the containing space 124a. On the other hand, a terminal 128a of the first pushing element 128 may be firmly fixed to/located on the second plate 124. Furthermore, the terminal 128a of the first pushing element 128 may be located on a surface 124b of the second plate 124 opposite to the first plate 122 with a screw 500, but the invention is not limited to. For example, when the moving element 126 moves to one of the withstanding holes 125a of the groove 125, the first pushing element 128 is abutted against/on the moving element 126 along the second direction D2 such that the moving element 126 is stably abutted against/on one of the withstanding holes 125a, thereby resulting in fixing the relative position of the first plate 122 and the second plate 124.

In the embodiment, the first pushing element 128 is an elastic element. Furthermore the first pushing element 128 may be, but not limited to, an elastic piece or a leaf spring. In addition, the first direction D1 is perpendicular to the second direction D2, and the second direction D2 is parallel to an extending direction of an optical axis 110a of the lens 110.

Figure 2B:
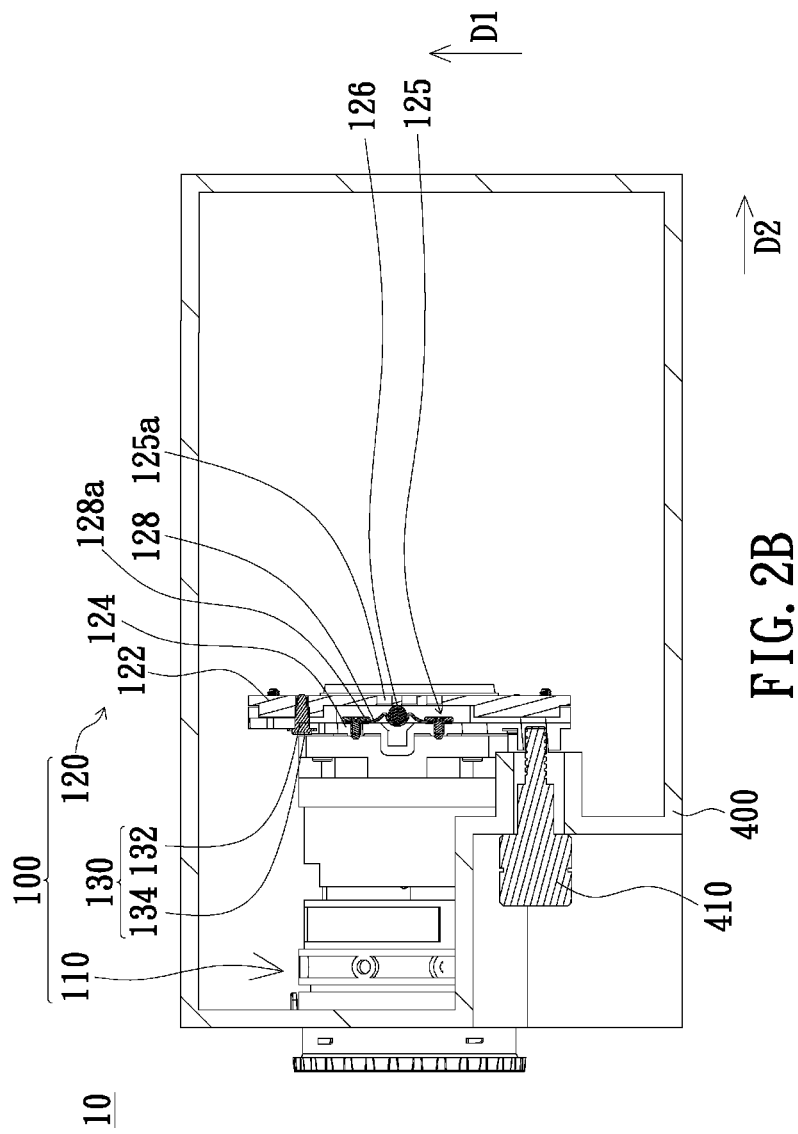
FIG. 2B illustrates a schematic view of the projection apparatus of FIG. 1 when the projection apparatus moves.
Figure 2C:
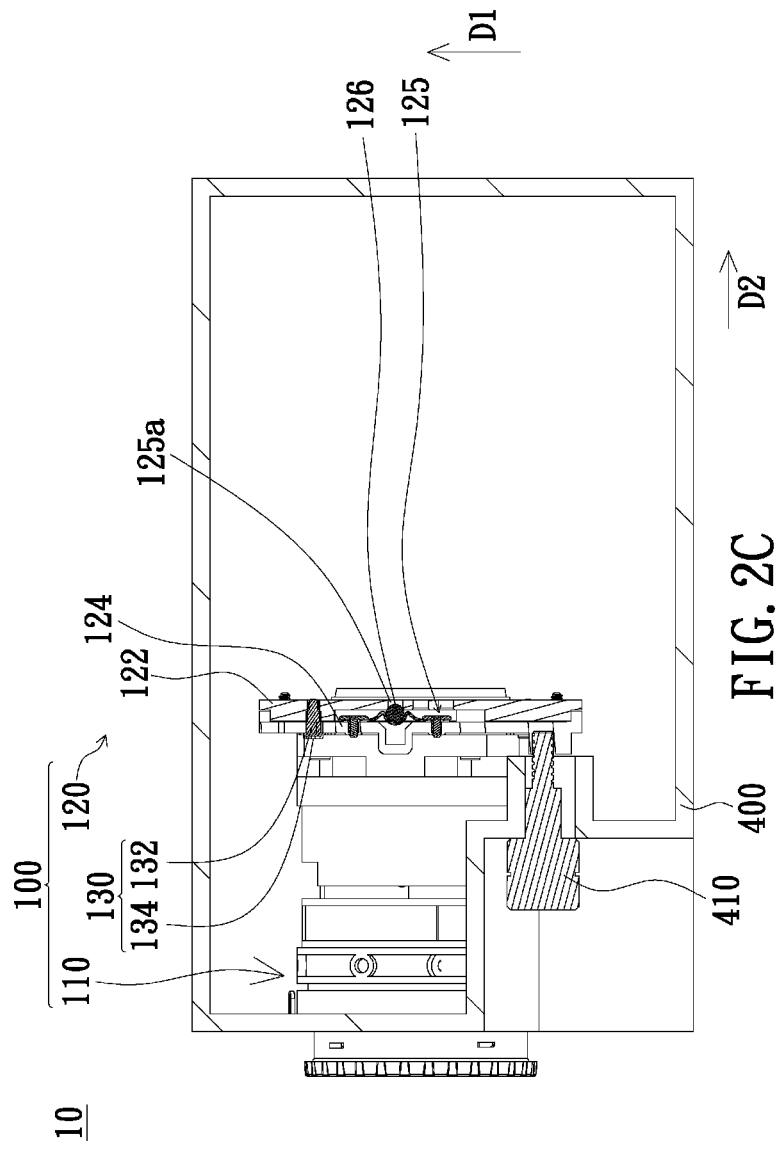
FIG. 2C illustrates a schematic view of the projection apparatus of FIG. 1 when the projection apparatus moves.

Moreover, as shown in FIG. 2A-FIG. 2C, since the first pushing element 128 may be fixed to/located on the second plate 124, the second plate 124 fixed to/located with the lens 110 may move relative to the first plate 122 along the first direction D1 when an offset of the optical axis 110a of the lens 110 has to be changed, and thus the first pushing element 128 drives the moving element 126 to slip out of one of the withstanding holes 125a (as shown in FIG. 2B, the moving element 126 slips out of the middle one of the withstanding holes 125a), and then the first pushing element 128 drives the moving element 126 to slip into/to and abut against/on another withstanding hole 125a (as shown in FIG. 2C, the moving element 126 slips into/to the upper one of the withstanding holes 125a) to change the relative position of the second plate 124 and the first plate 122. Therefore, an exposed position of the lens 110 exposed to the shell 400 may be changed such that the offset of the light axis 110a of the lens 110 may be changed. In the other words, a projecting position of a projecting beam L3 (seeing FIG. 1) emitted by the lens 110 to show a projecting image may be changed.

Return to FIG. 2A, in the embodiment, the lens module 100 includes a limiting element 130. The limiting element 130 has a limiting pillar 132 and a limiting block 134 connected to the limiting pillar 132, the limiting pillar 132 is fixed to and connected between the limiting block 134 and the first plate 122. The second plate 124 has a long hole 124c hitching the limiting pillar 132, and the second plate 124 is limited between the limiting block 134 and the first plate 122. Furthermore, a long aperture of the long hole 124c is parallel to the first direction D1 to limit the second plate 124 to only move along the first direction D1. That is to say, a movable range of the second plate 124 is decided by two opposite terminals of the long hole 124c. In the embodiment, when the limiting pillar 132 is abutted against/on one of the terminals (such as an upper terminal) of the long hole 124c, the second plate 124 may only move to the other terminal (such as a lower terminal) of the long hole 124c along the first direction D1. On the other hand, the limiting block 134 is located adjacent to the second plate 124 to limit the second plate 124 to be able to move relative to the first plate 122, and the second plate 124 may be nestled to/against the first plate 122 without being separate from the first plate 122. In addition, in the embodiment, a length of the long aperture of the long hole 124c is about, but not limited to, equal to a length of a longest interval of two opposite withstanding holes 125a of the groove 125.

In some embodiments, the limiting pillar 132 and the first plate 122 may be integrally formed. In another embodiment, the limiting pillar 132, the first plate 122, and the limiting block 134 may be integrally formed; or the limiting pillar 132 and the limiting block 134 may be integrally formed to be a screw. However, the descriptions mentioned above are just exemplified and do not limit the invention.

Figure 3:
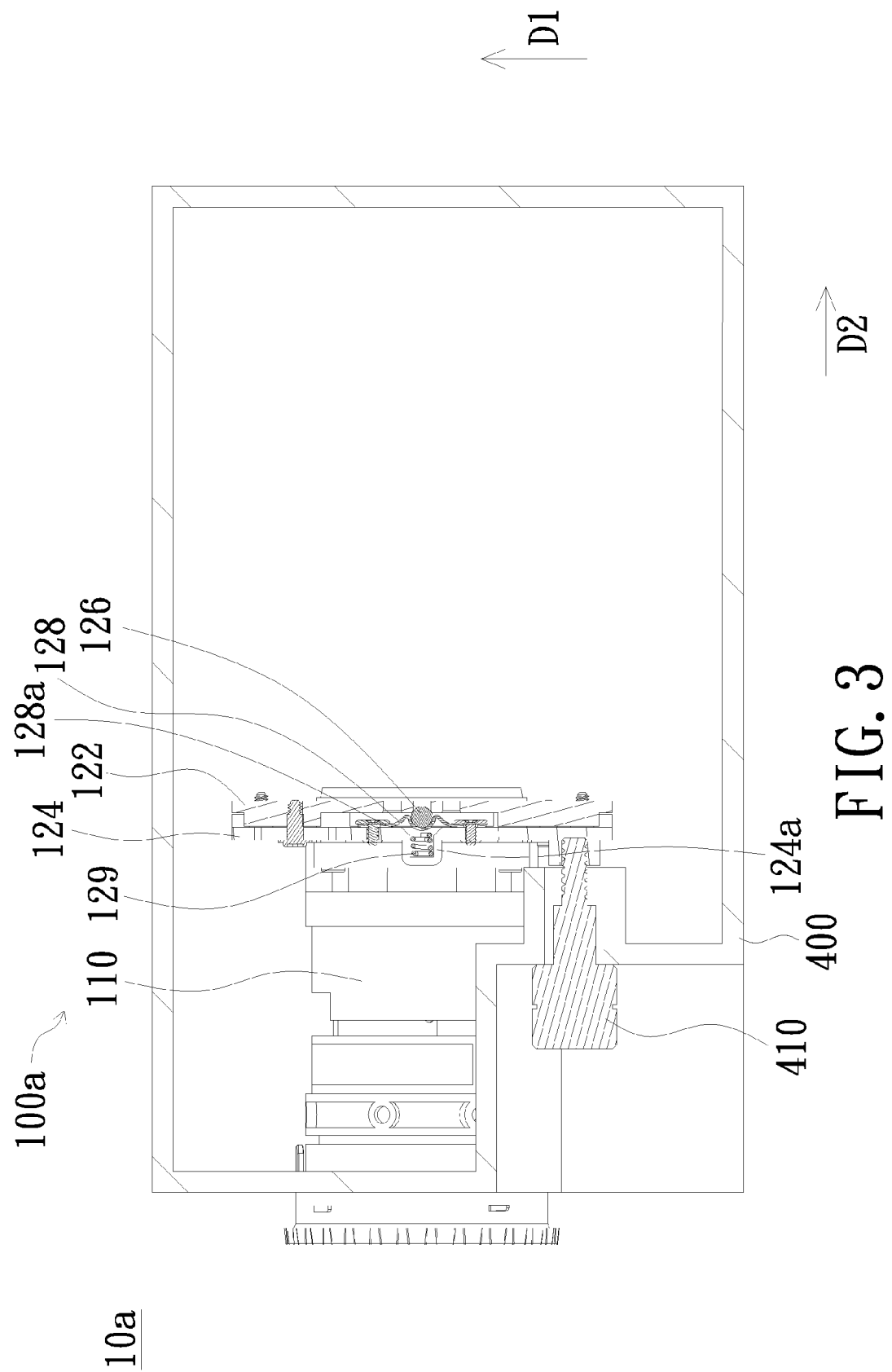
FIG. 3 illustrates a cross-sectional view along a section line A-A' of a projection apparatus according to another embodiment of the invention.

Please refer to FIG. 3, it shows a cross-sectional view along a section line A-A' of a projection apparatus 10a according to another embodiment of the invention. As shown in FIG. 3, the lens module 100a further includes a second pushing element 129 connected to the first pushing element 128. The first pushing element 128 and the second pushing element 129 are configured to jointly move along the second direction D2 to abut against/push the moving element 126. For example, when a pushing power/force of the first pushing element 128 is insufficient to push the moving element 126, the second pushing element 129 may assist the first pushing element 128 in jointly pushing the moving element 126. In the embodiment, the second pushing element 129 may be, but not limited to, an elastic element. Furthermore, the second pushing element 129 may be, but not limited to, a spring. In the embodiment, the second pushing element 129 and the first pushing element 128 are, but not limited to, jointly disposed in the containing space 124a of the second plate 124.

Figure 4:
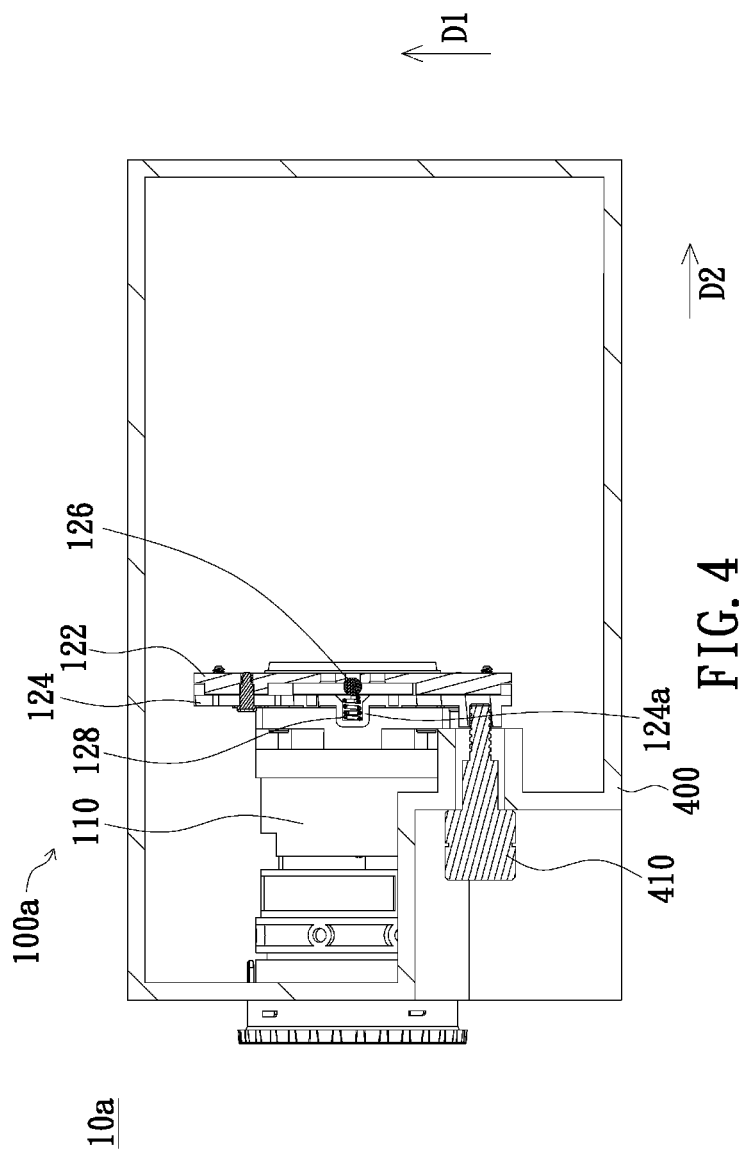
FIG. 4 illustrates a cross-sectional view along a section line A-A' of a projection apparatus according to another embodiment of the invention.

In addition, please refer to FIG. 4, it shows a cross-sectional view along a section line A-A' of a projection apparatus according to another embodiment of the invention. In some embodiments, the first pushing element 128 of the lens module 100a may be, but not limited to, a spring for abutting against/pushing the moving element 126 and disposed in the containing space 124a of the second plate 124.

Figure 5:
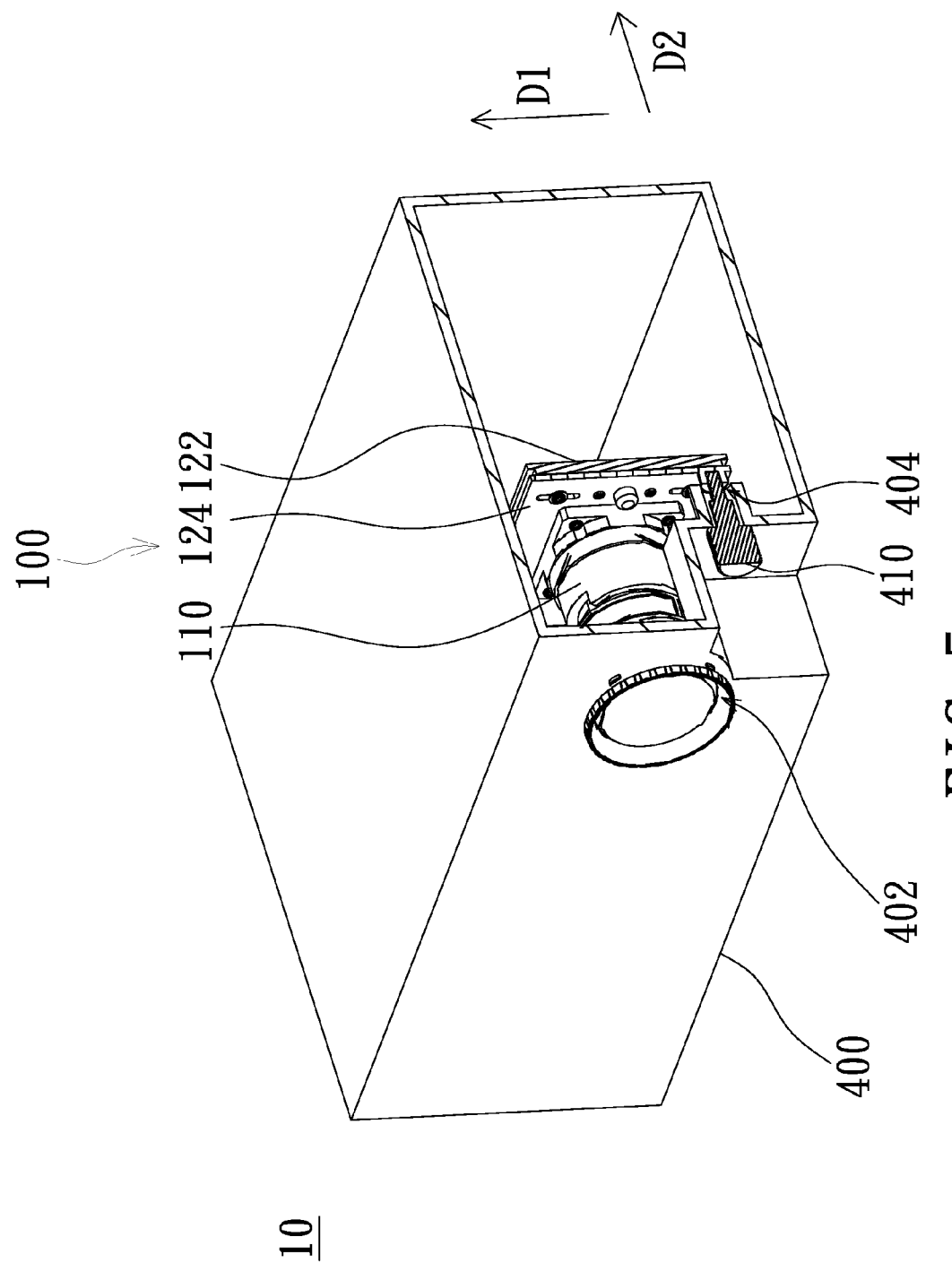
FIG. 5 illustrates a cross-sectional view along a section line B-B' of the projection apparatus of FIG. 1.

Please refer to FIG. 5, it shows a cross-sectional view along a section line B-B' of the projection apparatus 10 of FIG. 1. As shown in FIG. 5, in the embodiment, the projection apparatus 10 includes a limiting rod 410 connected to the second plate 124 and a part of the limiting rod 410 is exposed to a second opening 404 of the shell 400, and the limiting rod 410 is in contact with/connected to the shell 400 to cause the lens module 100 to be firmly fixed to/on the shell 400. Furthermore, the limiting rod 410 is penetrated through the second opening 404 of the shell 400 and the limiting rod 410 is screwed on/to the second plate 124. In addition, when the limiting rod 410 rotates along one direction such as a clockwise direction, a terminal of the limiting rod 410 is screwed into the second plate 124 and a part of the limiting rod 410 is stopped/blocked to cling to/be adjacent to an outer surface of the shell 400 such that a static friction between the limiting rod 410 and the shell 400 may be increased to limit a movement of the second plate 124, thereby resulting in fixing a position of the lens 110 relative to the first opening 402 of the shell 400. On the other hand, when the limiting rod 410 rotates along the other direction such as a counter-clockwise direction, the terminal of the limiting rod 410 is screwed out of the second plate 124 and a part of the limiting rod 410 may be separated from the outer surface of the shell 400 such that the second plate 124 may move relative to the first plat 122 to further adjust the offset of the lens 110. In the embodiment, the an outer surface of the limiting rod 410 may, but not be limited to, have nicks/notches such that an user may stably catch the limiting rod 410 to conveniently operate the limiting rod 410.

In the forgoing description, the offset of the light axis of the lens of the lens module of the projection apparatus of the embodiment may be changed by the locking structure of the lens module such that the image beam emitted by the projection apparatus may be projected to a corresponding/different location(s) according to the location of the projection apparatus or the desired projecting location, thereby result in enhancing the utility and the convention for using of the projection apparatus. In the embodiment of the invention, since the locking structure is disposed on the lens module, the integral volume and the integral weight of the projection apparatus are not increased. On other hand, the locking structure has a simple configuration to be capable of decreasing the addition cost of the projection apparatus manufacturing process.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
   a light source, configured to provide a light beam;
   a light valve, configured to convert the light beam into an image beam; and
   a lens module, configured to convert the image beam into a projecting beam, the lens module comprises:
      a lens; and
      a locking structure, connected to the lens, the locking structure comprises:
         a first plate;
         a second plate, disposed between the first plate and the lens and firmly fixed to the lens, wherein a groove is formed between the first plate and the second plate, and the groove has a plurality of withstanding holes arranged along a first direction;
         a moving element, disposed between the first plate and the second plate, configured for movably abutting against one of the withstanding holes; and
         a first pushing element, in contact with the moving element, disposed between the moving element and the second plate, configured for abutting against the moving element along a second direction unparallel to the first direction to cause the moving element to abut along an extending direction of an optical axis of the lens, wherein the extending direction of the optical axis of the lens is parallel to the second direction.

2. The projection apparatus according to claim 1, wherein the first pushing element drives the moving element to slip into and abut against one of the withstanding holes or the first pushing element drives the moving element to slip out of one of the withstanding holes when the second plate moves relative to the first plate along the first direction.

3. The projection apparatus according to claim 1, wherein the first direction is perpendicular to the second direction.

4. The projection apparatus according to claim 1, wherein the lens module further comprises a limiting element having a limiting pillar and a limiting block connected to the limiting pillar, the limiting pillar is firmly fixed to and connected between the limiting block and the first plate, the second plate has a long hole hitching the limiting pillar for limiting between the limiting block and the first plate, and a long aperture of the long hole is parallel to the first direction to limit the second plate to move along the first direction.

5. The projection apparatus according to claim 1, wherein the moving element is a sphere.

6. The projection apparatus according to claim 1, wherein the first pushing element is an elastic element.

7. The projection apparatus according to claim 1, wherein the lens module further comprises a second pushing element connected to the first pushing element, and the first pushing element and the second pushing element are configured to jointly move along the second direction to abut against the moving element.

8. The projection apparatus according to claim 7, wherein the second pushing element is an elastic element.

9. The projection apparatus according to claim 1, further comprising a shell, wherein the light source and the light valve are disposed in the shell, and a part of the lens module is exposed to a first opening of the shell to limit the lens module to move along the first direction.

10. The projection apparatus according to claim 9, further comprising a limiting rod connected to the second plate, wherein a part of the limiting rod is exposed to a second opening of the shell, and the limiting rod contacts the shell to cause the lens module to be firmly fixed to the shell.

11. A lens module, comprising:
a lens; and
a locking structure, connected to the lens, the locking structure comprises:
 a first plate;
 a second plate, disposed between the first plate and the lens and firmly fixed to the lens, wherein a groove is formed between the first plate and the second plate, and the groove has a plurality of withstanding holes arranged along a first direction;
 a moving element, disposed between the first plate and the second plate, configured for movably abutting against one of the withstanding holes; and
 a first pushing element, in contact with the moving element, disposed between the moving element and the second plate, configured for abutting against the moving element along a second direction unparallel to the first direction to cause the moving element to abut along an extending direction of an optical axis of the lens, wherein the extending direction of the optical axis of the lens is parallel to the second direction.

12. The lens module according to claim 11, wherein the first pushing element drives the moving element to slip into and abut against one of the withstanding holes or the first pushing element drives the moving element to slip out of one of the withstanding holes when the second plate moves relative to the first plate along the first direction.

13. The lens module according to claim 11, wherein the first direction is perpendicular to the second direction.

14. The lens module according to claim 11, further comprises a limiting element having a limiting pillar and a limiting block connected to the limiting pillar, the limiting pillar is firmly fixed to and connected between the limiting block and the first plate, the second plate has a long hole hitching the limiting pillar for limiting between the limiting block and the first plate, and a long aperture of the long hole is parallel to the first direction to limit the second plate to move along the first direction.

15. The lens module according to claim 11, wherein the moving element is a sphere.

16. The lens module according to claim 11, wherein the first pushing element is an elastic element.

17. The lens module according to claim 11, further comprises a second pushing element connected to the first pushing element, and the first pushing element and the second pushing element are configured to jointly move along the second direction to abut against the moving element.

18. The lens module according to claim 17, wherein the second pushing element is an elastic element.

19. A locking structure, configured to connect to a lens, the locking structure comprising:
a first plate and a second plate, wherein a groove is formed between the first plate and the second plate, the groove has a plurality of withstanding holes, and the withstanding holes are arranged along a first direction;
a moving element, disposed between the first plate and the second plate, configured for movably abutting against one of the withstanding holes; and
a pushing element, in contact with the moving element, disposed between the moving element and the second plate, configured to abut against and connect to the moving element along a second direction unparallel to the first direction to cause the moving element to abut along an extending direction of an optical axis of the lens, wherein the extending direction of the optical axis of the lens is parallel to the second direction.

20. The locking structure according to claim 19, wherein the pushing element drives the moving element to slip into and abut against one of the withstanding holes or the pushing element drives the moving element to slip out of one of the withstanding holes when the second plate moves relative to the first plate along the first direction.

21. A projection apparatus, comprising:
a light source, configured to provide a light beam;
a light valve, configured to convert the light beam into an image beam; and
a lens module, configured to convert the image beam into a projecting beam, the lens module comprises:
 a lens; and
 a locking structure, connected to the lens, the locking structure comprises:
  a first plate;
  a second plate, disposed between the first plate and the lens and firmly fixed to the lens, wherein a groove is formed between the first plate and the second plate, and the groove has a plurality of withstanding holes arranged along a first direction;
  a moving element, disposed between the first plate and the second plate, configured for movably abutting against one of the withstanding holes; and
  a first pushing element, disposed between the moving element and the second plate, configured for abutting against the moving element along a second direction unparallel to the first direction; and
  a limiting element, having a limiting pillar and a limiting block connected to the limiting pillar, the limiting pillar is firmly fixed to and connected between the limiting block and the first plate, the second plate has a long hole hitching the limiting pillar for limiting between the limiting block and the first plate, and a long aperture of the long hole is parallel to the first direction to limit the second plate to move along the first direction.

22. A projection apparatus, comprising:
a light source, configured to provide a light beam;
a light valve, configured to convert the light beam into an image beam; and
a lens module, configured to convert the image beam into a projecting beam, the lens module comprises:
   a lens; and
   a locking structure, connected to the lens, the locking structure comprises:
      a first plate;
      a second plate, disposed between the first plate and the lens and firmly fixed to the lens, wherein a groove is formed between the first plate and the second plate, and the groove has a plurality of withstanding holes arranged along a first direction;
      a moving element, disposed between the first plate and the second plate, configured for movably abutting against one of the withstanding holes; and
      a first pushing element, disposed between the moving element and the second plate, configured for abutting against the moving element along a second direction unparallel to the first direction; and
   a second pushing element, connected to the first pushing element, and the first pushing element and the second pushing element are configured to jointly move along the second direction to abut against the moving element.

23. A lens module, comprising:
a lens; and
a locking structure, connected to the lens, the locking structure comprises:
   a first plate;
   a second plate, disposed between the first plate and the lens and firmly fixed to the lens, wherein a groove is formed between the first plate and the second plate, and the groove has a plurality of withstanding holes arranged along a first direction;
   a moving element, disposed between the first plate and the second plate, configured for movably abutting against one of the withstanding holes; and
   a first pushing element, disposed between the moving element and the second plate, configured for abutting against the moving element along a second direction unparallel to the first direction; and
a limiting element, having a limiting pillar and a limiting block connected to the limiting pillar, the limiting pillar is firmly fixed to and connected between the limiting block and the first plate, the second plate has a long hole hitching the limiting pillar for limiting between the limiting block and the first plate, and a long aperture of the long hole is parallel to the first direction to limit the second plate to move along the first direction.

24. A lens module, comprising:
a lens; and
a locking structure, connected to the lens, the locking structure comprises:
   a first plate;
   a second plate, disposed between the first plate and the lens and firmly fixed to the lens, wherein a groove is formed between the first plate and the second plate, and the groove has a plurality of withstanding holes arranged along a first direction;
   a moving element, disposed between the first plate and the second plate, configured for movably abutting against one of the withstanding holes; and
   a first pushing element, disposed between the moving element and the second plate, configured for abutting against the moving element along a second direction unparallel to the first direction; and
a second pushing element, connected to the first pushing element, and the first pushing element and the second pushing element are configured to jointly move along the second direction to abut against the moving element.

* * * * *